United States Patent
Omura et al.

(12) 
(10) Patent No.: US 6,515,095 B1
(45) Date of Patent: Feb. 4, 2003

(54) NITROGEN ATOM-CONTAINING POLYSILOXANES, THEIR PREPARATION, AND FIBER AND FABRIC FINISHING AGENT COMPOSITIONS

(75) Inventors: Naoki Omura, Usui-gun (JP); Kenichi Isobe, Usui-gun (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/599,023

(22) Filed: Jun. 21, 2000

(30) Foreign Application Priority Data

Jun. 25, 1999 (JP) ............................................. 11-180093
Jun. 25, 1999 (JP) ............................................. 11-180094

(51) Int. Cl.[7] .............................................. C08G 77/26
(52) U.S. Cl. ...................... 528/38; 556/425; 8/DIG. 1; 8/115.6
(58) Field of Search .......................... 528/38; 556/425; 8/DIG. 1, 115.6

(56) References Cited

U.S. PATENT DOCUMENTS

| 3,355,424 A | 11/1967 | Brown |
| 3,574,674 A | 4/1971 | Taylor |
| 4,247,592 A | 1/1981 | Kalinowski |
| 4,486,281 A | 12/1984 | Pigeon |
| 4,633,002 A | 12/1986 | Piskoti |
| 4,699,988 A | * 10/1987 | Traver et al. ............... 556/425 |
| 4,978,363 A | 12/1990 | Ona et al. |
| 5,109,093 A | 4/1992 | Rees et al. |
| 5,302,671 A | * 4/1994 | Cifuentes et al. ........... 525/477 |
| 5,391,675 A | * 2/1995 | Cray et al. .................... 528/14 |
| 5,561,179 A | 10/1996 | Borzatta et al. |
| 6,284,860 B1 | 9/2001 | Sommer et al. |

FOREIGN PATENT DOCUMENTS

| EP | 0050453 A1 | 10/1981 |
| EP | 0081444 A1 | 12/1982 |
| EP | 0 157 499 | 2/1985 |
| EP | 0 159 120 | 2/1985 |
| EP | 0515044 A1 | 4/1992 |
| EP | 0628603 A2 | 6/1994 |
| EP | 0757074 A2 | 7/1996 |
| EP | 0940404 A1 | 12/1998 |
| EP | 0992528 A2 | 9/1999 |
| JP | 46-3627 | 1/1971 |
| JP | 48-1480 | 1/1973 |
| JP | 54-43614 | 12/1979 |
| JP | 57-101046 | 6/1982 |
| JP | 57-43673 | 9/1982 |
| JP | 59-179884 | 10/1984 |
| JP | 60-185879 | 9/1985 |
| JP | 60-185880 | 9/1985 |
| JP | 64-61576 | 3/1989 |
| JP | 1-306683 | 12/1989 |
| JP | 2-47371 | 2/1990 |
| JP | 6-184257 | 7/1994 |
| JP | 2857203 | 11/1998 |
| WO | WO92/07027 | 4/1992 |
| WO | WO99/06486 | 2/1999 |

OTHER PUBLICATIONS

Silicon Based Polymer Science, Zeigler et al., p. 135. 1990.*
English abstract of Japan 02047371.
English abstract of Japan 06184257.

* cited by examiner

Primary Examiner—Margaret G. Moore
(74) Attorney, Agent, or Firm—Millen, White, Zelano & Branigan, P.C.

(57) ABSTRACT

Novel nitrogen atom-containing polysiloxanes having residual alkoxy groups are provided. Compositions comprising the same are effective for treating fibers or fibrous materials for imparting softness and durability of home laundering and preventing yellowing.

25 Claims, 4 Drawing Sheets

NITROGEN ATOM-CONTAINING POLYSILOXANES, THEIR PREPARATION, AND FIBER AND FABRIC FINISHING AGENT COMPOSITIONS

This invention relates to nitrogen atom-containing polysiloxanes which can be synthesized from inexpensive reactants and useful as the main component of fiber and fabric finishing agent compositions for imparting softness and durability of home laundering to a variety of fibers or fibrous materials, methods for preparing the same, and fiber and fabric finishing agent compositions.

BACKGROUND OF THE INVENTION

A number of organopolysiloxanes such as dimethylpolysiloxanes, epoxy group-containing polysiloxanes, and nitrogen atom-containing polysiloxanes have been widely used as treating agents for imparting softness and smoothness to a variety of fibers or fibrous materials. Most widely used among others are the nitrogen atom-containing polysiloxanes, especially aminoalkyl group-containing organopolysiloxanes, which can impart satisfactory softness to a variety of fibers or fibrous materials. More specifically, fiber treating agents based on organopolysiloxanes having such aminoalkyl groups as $-C_3H_6NH_2$ and $-C_3H_6NHC_2H_4NH_2$ are widely used because of their softness capability as disclosed in JP-B 48-1480, JP-B 54-43614, JP-B 57-43673, JP-A 60-185879, JP-A 60-185880, and JP-A 64-61576.

These nitrogen atom-containing polysiloxanes are generally synthesized by equilibrating with alkalis dimethyl cyclics such as 1,1,3,3,5,5,7,7-octamethylcyclotetrasiloxane, nitrogen atom-containing trialkoxysilanes, nitrogen atom-containing cyclopolysiloxanes, etc.

In the silicone industry, the dimethylsiloxy sources for polysiloxanes are dimethyl cyclics obtained by hydrolyzing dimethyldichlorosilane and distilling the hydrolyzate, and $\alpha,\omega$-dihydroxydimethylpolysiloxane which is the still residue. Since the former is in greater demand than the latter, the latter is converted by cracking into the former as needed. As compared with the former, the latter is inexpensive.

Since the nitrogen atom-containing polysiloxanes as typified by aminoalkyl group-containing organopolysiloxanes are currently used for general purposes, there is an increasing demand for cost reduction. If $\alpha,\omega$-dihydroxydimethylpolysiloxane could be used as the starting reactant, it would become possible to synthesize nitrogen atom-containing polysiloxanes in an inexpensive manner. There is a need for such a synthetic method.

As the method for obtaining higher molecular weight polysiloxanes from $\alpha,\omega$-dihydroxydimethylpolysiloxane as the starting reactant, alcohol-removing reaction with alkoxysilanes is known. However, a high temperature or a catalyst is essential for this reaction because of low reactivity. British Patent No. 9,188,239 discloses the use of an amino compound salt with phosphoric acid or carboxylic acid as the catalyst. Japanese Patent No. 2,857,203 discloses the use of strontium hydroxide or barium hydroxide as the catalyst. However, the amino compound salts with phosphoric acid or carboxylic acid give rise to a yellowing problem when applied to white or tint color fibers or fibrous materials. Additionally, it is difficult to remove the catalyst from the product since most of these catalysts are liquid. On the other hand, such catalysts as strontium hydroxide and barium hydroxide also become foreign matters in the fiber treating step and cause cracking of polysiloxanes. This necessitates an extra step of removing the catalyst. An efficient reaction method without a need for a catalyst is thus demanded.

Among prior art nitrogen atom-containing poly-siloxanes, aminoalkyl group-containing organopolysiloxanes are most common. They suffer from the problem that the softness imparted thereby lowers during long-term use or by repeated washing. There is a need for nitrogen atom-containing polysiloxanes having long-lasting performance.

JP-B 46-3627 discloses the condensates of $\alpha,\omega$-dihydroxydimethylpolysiloxane with amino group-containing alkoxysilanes, but reaction conditions are described nowhere. In Examples described therein, the ratio of the moles of $\alpha,\omega$-dihydroxydimethylpolysiloxane to the moles of amino group-containing alkoxysilane is 0.07 or 0.02. These ratios are outside the range used in the present invention. Also, JP-A 6-184257 discloses analogous condensates, but no reference is made to the preparation method. No alkoxy groups are left in these condensates, that is, all alkoxy groups are replaced by $\alpha,\omega$-dihydroxydimethylpolysiloxane. This structure differs from the polysiloxanes of the present invention. Further, U.S. Pat. No. 3,355,424 discloses piperidyl group-containing organopolysiloxanes which are prepared by hydrolytic condensation of an addition product of allyloxypiperidine and a dialkoxysilane. This preparation method differs from the method of the present invention. No alkoxy groups are left in these condensates.

Further, fibers treated with organopolysiloxanes having such aminoalkyl groups as $-C_3H_6NH_2$ and $-C_3H_6NHC_2H_4NH_2$ suffer from degradation of amino groups by heat or ultraviolet radiation during heat treatment, drying or aging. In particular, white or tint color fibers or fibrous materials treated with such organopolysiloxanes have the serious problem that their color changes to yellow and their softness lowers during heat treatment, drying or aging.

For preventing the yellowing problem, it was proposed to modify aminoalkyl group-containing organopolysiloxanes, for example, by reacting the aminoalkyl groups with organic acid anhydrides or chlorides (JP-A 57-101046), epoxy compounds (JP-A 59-179884), higher fatty acids (JP-A 1-306683), and carbonates (JP-A 2-47371).

As compared with the unmodified aminoalkyl group-containing organopolysiloxanes, these modified organopoly-siloxanes were found to be improved in anti-yellowing effect, but to a still insufficient extent. With respect to the impartment of softness and smoothness to fibers or fabrics, the modified ones are rather inferior to the unmodified ones.

SUMMARY OF THE INVENTION

An object of the invention is to provide a novel and improved nitrogen atom-containing polysiloxane which is effective as a main component of a fiber-treating agent composition for imparting softness and smoothness to fibers or fibrous materials while minimizing the yellowing thereof.

Another object of the invention is to provide a novel and improved nitrogen atom-containing polysiloxane which is effective as a main component of a fiber and fabric finishing agent composition for imparting to fibers or fibrous materials a softness which is not only high at the initial, but also lasts even after washing.

A further object of the invention is to provide a method for preparing the nitrogen atom-containing polysiloxane.

A still further object of the invention is to provide a fiber and fabric finishing agent composition comprising the nitrogen atom-containing polysiloxane as a main component.

We have found that an organopolysiloxane having some alkoxy groups left intact is effective for enhancing the bond to a substrate and improving softness, and durability of home laundering. In the resulting polymer, amino group-containing silicon atoms are not present as blocks, but regularly distributed in accordance with the degree of polymerization of α,ω-dihydroxypolysiloxane. This feature is the largest difference from the polymers prepared by the prior art technique of alkali equilibration. The regular distribution of amino groups in the polymer is effective for improving softness and durability. The invention is predicated on this finding.

In a first aspect, the invention provides a nitrogen atom-containing polysiloxane having at least one polymer terminus represented by the general formula (1).

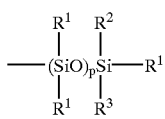
(1)

Herein $R^1$ is a nitrogen-free, substituted or unsubstituted, monovalent organic group of 1 to 20 carbon atoms, $R^2$ is a monovalent organic group containing at least one nitrogen atom, $R^3$ is an organoxy group represented by $-OR^1$, and p is a positive number of 2 to 2,000.

In a second aspect, the invention provides a method for preparing a nitrogen atom-containing polysiloxane as defined above, comprising the step of effecting alcohol-removing reaction between (A) an organopolysiloxane of the general formula (5):

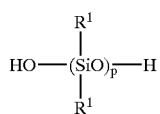
(5)

wherein $R^1$ and p are as defined above and (B) an organosilane of the general formula (6):

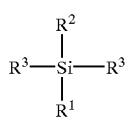
(6)

wherein $R^1$, $R^2$, and $R^3$ are as defined above.

In a third aspect, the invention provides a nitrogen atom-containing polysiloxane comprising at least one unit represented by the general formula (11).

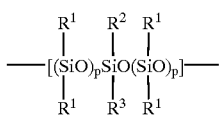
(11)

Herein $R^1$ is a nitrogen-free, substituted or unsubstituted, monovalent organic group of 1 to 20 carbon atoms, $R^2$ is independently a monovalent organic group containing at least one nitrogen atom, $R^3$ is an organoxy group represented by $-OR^1$, and p is a positive number of 2 to 2,000.

In a fourth aspect, the invention provides a method for preparing a nitrogen atom-containing polysiloxane as defined above, comprising the step of effecting alcohol-removing reaction between (A) an organopolysiloxane of the general formula (5):

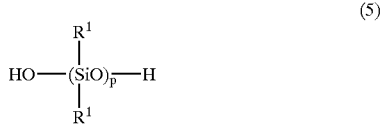
(5)

wherein $R^1$ and p are as defined above and (C) an organosilane of the general formula (13):

(13)

wherein $R^2$ and $R^3$ are as defined above.

Also contemplated herein is a fiber and fabric finishing agent composition comprising the above-defined nitrogen atom-containing polysiloxane as a main component.

We have found that a nitrogen atom-containing polysiloxane in which a nitrogen atom-containing group of formula (1) is selectively introduced into the polymer terminal group, upon treatment of fibers or fibrous materials therewith, ensures efficient reaction with fiber surfaces, improves durability, minimizes yellowing by heat or UV radiation after treatment because of a reduced number of nitrogen atoms not adsorbed on fiber surfaces, prevents the fibers or fibrous materials from yellowing, and imparts excellent softness.

Although the prior art method of synthesizing nitrogen atom-containing polysiloxanes by equilibrating with alkalis dimethyl cyclics such as 1,1,3,3,5,5,7,7-octamethyl-cyclotetrasiloxane, nitrogen atom-containing trialkoxy-silanes, nitrogen atom-containing cyclopolysiloxanes, etc. is impossible to selectively introduce a nitrogen atom-containing group into the polymer terminus, the compound of the invention can be prepared by reacting αω-dihydroxydimethylpolysiloxane with a nitrogen atom-containing dialkoxysilane while removing the resultant alcohol from the reaction system. Since the nitrogen atom-containing trialkoxysilane functions as a catalyst for removing the alcohol, this reaction readily takes place without a need for a catalyst.

JP-A 9-137061 discloses a nitrogen atom-containing polysiloxane prepared by alcohol-removing reaction of αω-dihydroxydimethylpolysiloxane as the starting reactant. This method has the drawback that reaction is very slow in the absence of a catalyst such as sodium phosphate or barium hydroxide. Where the catalyst is used, an extra step of neutralizing or removing the catalyst is necessary, complicating the overall process. The average structure of the thus prepared polysiloxane is described in this patent although the general structure is described nowhere. It is not attempted to produce a nitrogen atom-containing polysiloxane having a nitrogen atom-containing group selectively introduced at the polymer terminus as in the present invention.

By $^{29}$Si-NMR analysis, we have found the following fact. When αω-dihydroxydimethylpolysiloxane is reacted with a nitrogen atom-containing dialkoxysilane, the nitrogen atom-containing dialkoxysilane becomes a self catalyst so that the first alkoxy group may undergo quick alcohol-removing reaction without a need for catalyst, but the second alkoxy group undergoes little alcohol-removing reaction. Further, where a nitrogen atom-containing trialkoxysilane is used, this nitrogen atom-containing alkoxysilane similarly becomes a self catalyst so that the first and second alkoxy groups may undergo quick alcohol-removing reaction without a need for catalyst, but the third alkoxy group is quite poorly reactive as compared with the first and second ones.

We have thus found that by reacting inexpensive αω-dihydroxydimethylsiloxane with a nitrogen atom-containing triorganoxysilane on the basis of the above-described reaction scheme, a novel nitrogen atom-containing polysiloxane having a desired degree of polymerization is readily obtainable without a need for catalyst. In the resulting nitrogen atom-containing polysiloxane, nitrogen atom-containing groups are not present as blocks, but introduced at regular intervals in the polymer, and organoxy groups are contained on polymer side chains. For this reason, as compared with prior art nitrogen atom-containing polysiloxanes, the nitrogen atom-containing polysiloxane of the invention firmly bonds with fibers, accomplishing excellent softness, long-term softness retention, and durability of home laundering.

Also, the nitrogen atom-containing polysiloxane comprising units of formula (11) is prepared by starting with αω-dihydroxydimethylpolysiloxane which is the still residue after removal of cyclic polysiloxanes in the step of vacuum distilling hydrolyzates of dimethyldichlorosilane. Because low molecular weight components have almost been removed, the nitrogen atom-containing polysiloxane has a minimized content of low molecular weight components as compared with the prior art nitrogen atom-containing polysiloxanes resulting from equilibration. This minimizes the build-up problem or the contamination in a treatment dryer line by low molecular weight siloxanes.

Furthermore, the synthetic method of the invention can readily produce a silanol-terminated nitrogen atom-containing polysiloxane having a degree of polymerization of less than 200, although the prior art technique of equilibration with alkali compounds was difficult to produce such a polysiloxane.

DESCRIPTION OF THE PREFERRED EMBODIMENT

First Embodiment

Figure 1:
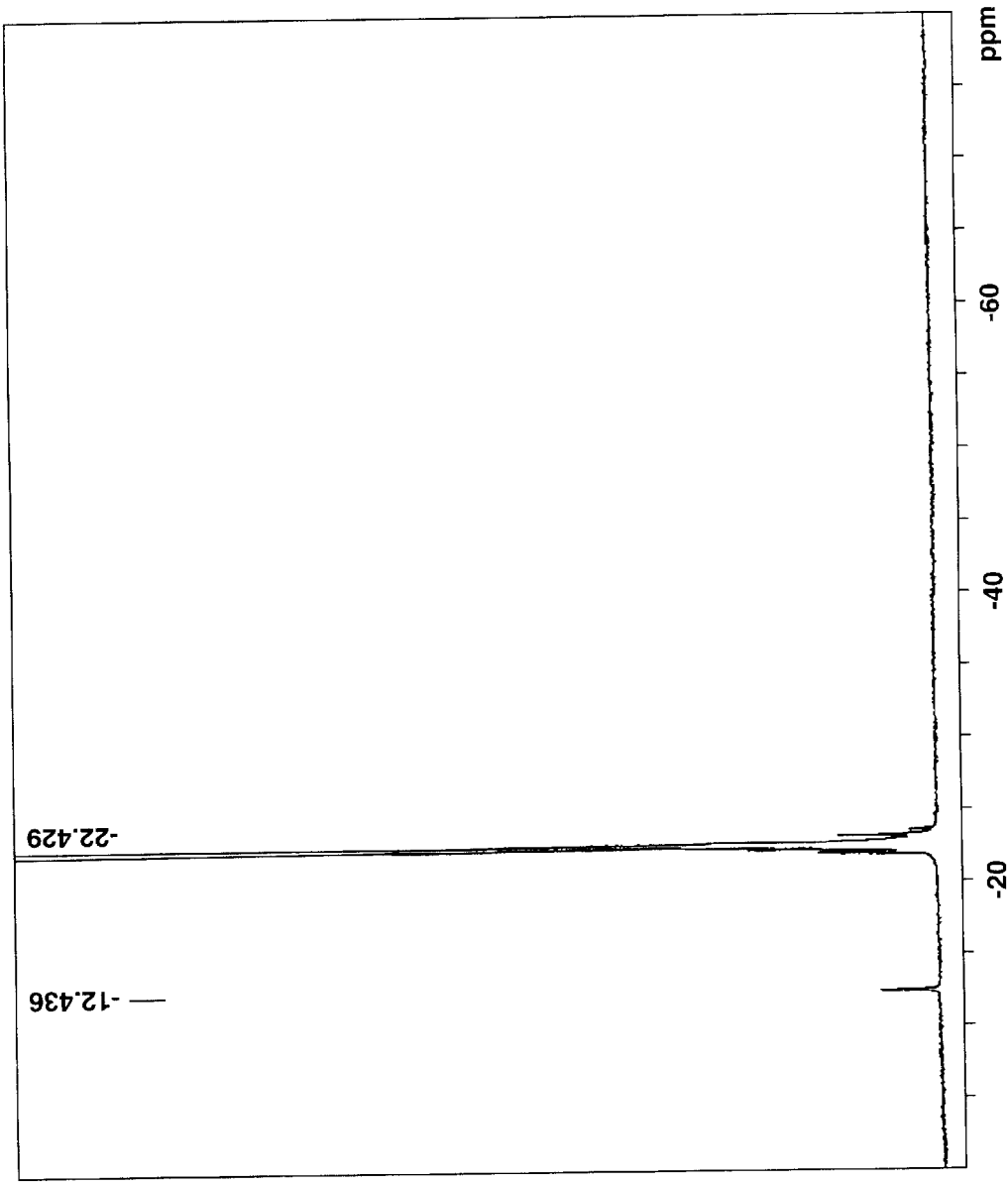
FIG. 1 is an NMR spectrum of the compound obtained in Synthetic Example 1.

In the first embodiment, the nitrogen atom-containing polysiloxane has at least one polymer terminus represented by the general formula (1).

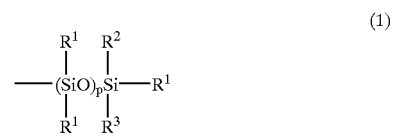

Herein $R^1$ is a nitrogen-free, substituted or unsubstituted, monovalent organic group of 1 to 20 carbon atoms, $R^2$ is a monovalent organic group containing at least one nitrogen atom, $R^3$ is an organoxy group represented by $-OR^1$, and p is a positive number of 2 to 2,000. The other terminus of the nitrogen atom-containing polysiloxane may be a hydroxyl group or a $OSiR^1R^2R^3$ group or even a $OSiR^1_3$ or $OSiR^1_2R^3$ group.

The polysiloxane is typically represented by the following general formula (I).

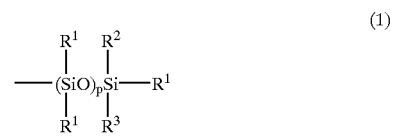

Herein, R is $-OH$, $-OSiR^1_3$, $-OSiR^1_2R^3$ or $-OSiR^1R^2R^3$.

In the organopolysiloxanes of the invention, the organic groups represented by $R^1$ include substituted or unsubstituted monovalent hydrocarbon groups of 1 to 20 carbon atoms, and especially 1 to 3 carbon atoms. Examples of the organic groups represented by $R^1$ include alkyl groups such as methyl, ethyl, propyl, butyl, pentyl, hexyl, octyl, decyl, dodecyl, tetradecyl, octadecyl, and eicosyl, alkenyl groups such as vinyl, allyl, propenyl, butenyl and hexenyl, aryl groups such as phenyl and tolyl, aralkyl groups such as benzyl, phenylethyl and phenylpropyl, cycloalkyl groups such as cyclopentyl and cyclohexyl, and substituted ones of the foregoing groups in which some or all of the hydrogen atoms attached to carbon atoms are replaced by halogen atoms, e.g., halogenated alkyl groups such as chloromethyl and trifluoropropyl, and halogenated aryl groups such as chlorophenyl. Of these, preferably at least 90 mol % of the $R^1$ groups are methyl, phenyl, and trifluoropropyl.

$R^2$ stands for monovalent organic groups containing at least one nitrogen atom, for examples, groups of the following formulae (2), (3) and (4).

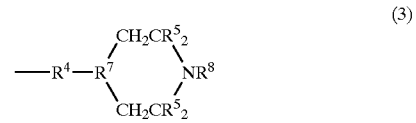

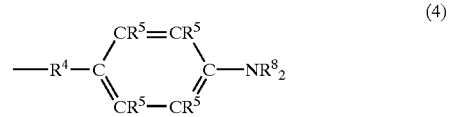

$R^4$ stands for divalent hydrocarbon groups of 1 to 6 carbon atoms, for example, alkylene groups such as methylene, dimethylene, trimethylene, tetramethylene, pentamethylene, and hexamethylene. Of these, trimethylene is desirable.

$R^5$ and $R^6$ are independently hydrogen or unsubstituted or hydroxyl-substituted monovalent hydrocarbon groups of 1 to 50 carbon atoms which may be separated by an oxygen atom, especially unsubstituted or hydroxyl-substituted alkyl groups. Examples are monovalent hydrocarbon groups of 1 to 8 carbon atoms including alkyl groups such as methyl, ethyl, propyl, butyl, pentyl, hexyl and octyl, and phenyl. Also included are groups represented by COR wherein R is an alkyl group of 1 to 10 carbon atoms and groups represented by $CH_2CH(OH)CH_2O(C_2H_4O)_nR^9$ wherein $R^9$ is hydrogen or a monovalent hydrocarbon group such as $C_{1-8}$ alkyl, and n is a positive number of 0 to 10. $R^5$ and $R^6$ may be the same or different, and a pair of $R^6$ may also be the same or different. Of these groups, hydrogen and methyl are preferred.

$R^7$ is —CH=, —N=, —OCH= or —ON=, and $R^8$ is hydrogen or methyl.

In formula (2), "a" is an integer of 0 to 4. Illustrative examples of the organic group $R^2$ represented by formula (2) include

—$C_3H_6NH_2$,

—$C_3H_6NHC_2H_4NH_2$, and

—$C_3H_6NHC_2H_4NHC_2H_4NH_2$.

Also included are substituted ones of these illustrative examples in which one or two hydrogen atoms in NH or $NH_2$ are replaced by COR wherein R is a $C_{1-10}$ alkyl group and in which one or two hydrogen atoms in NH or $NH_2$ are replaced by $CH_2CH(OH)CH_2O(C_2H_4O)_nR^9$ wherein $R^9$ is hydrogen or a monovalent hydrocarbon group (e.g., $C_{1-8}$ alkyl) and n is a positive number of 0 to 10.

In formula (1), $R^3$ is an organoxy group represented by —$OR^1$, preferably an alkoxy group of 1 to 6 carbon atoms. Illustrative examples of $R^3$ are methoxy, ethoxy and propoxy groups, with methoxy being most preferred.

Letter p is a positive number satisfying $2 \leq p \leq 2,000$, and preferably $10 \leq p \leq 300$.

Illustrative examples of the nitrogen atom-containing polysiloxane having at least one polymer terminus represented by the general formula (1) are given below.

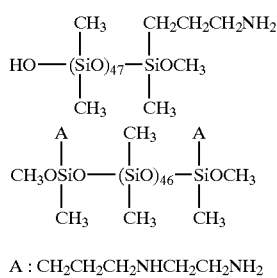

A : $CH_2CH_2CH_2NHCH_2CH_2NH_2$

Also included are substituted ones of these illustrative compounds in which one or two hydrogen atoms in NH or $NH_2$ are replaced by COR wherein R is a $C_{1-10}$ alkyl group and in which one or two hydrogen atoms in NH or $NH_2$ are replaced by $CH_2CH(OH)CH_2O(C_2H_4O)_nR^9$ wherein $R^9$ is hydrogen or a monovalent hydrocarbon group (e.g., $C_{1-8}$ alkyl) and n is a positive number of 0 to 10.

According to the invention, the nitrogen atom-containing polysiloxane of the first embodiment can be prepared by effecting alcohol-removing reaction between (A) a both end hydroxyl-blocked organopolysiloxane of the following general formula (5) and (B) a nitrogen atom-containing organosilane of the following general formula (6).

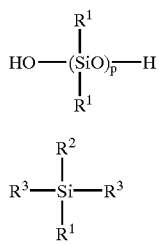

(5)

(6)

Herein $R^1$, $R^2$, $R^3$ and p are as defined above.

In formula (5), p is a positive number of 2 to 2,000 as defined above. If p is less than 2, because of unstable silanol, condensation reaction takes place parallel to the reaction with component (B), resulting in cyclic by-products. An organopolysiloxane of formula (5) in which p is greater than 2,000 is less reactive with a nitrogen-containing organosilane of formula (6). Preferably p is from 10 to 300. $R^1$ is as defined above, and preferably at least 90 mol % of the $R^1$ groups are methyl, phenyl, and trifluoropropyl. Illustrative examples of the organopolysiloxane of formula (5) are given below.

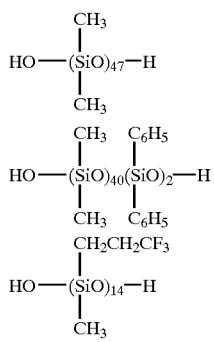

In formula (6), $R^1$, $R^2$ and $R^3$ are as defined for formula (1). Where $R^2$ stands for groups of formula (2), those groups wherein $R^6$ is H are preferred because of a high catalytic activity in reaction with component (A). Methyl is most preferred as $R^1$. Methoxy is most preferred as $R^3$ because it facilitates alcohol-removing reaction. Illustrative examples of such organosilanes are given below.

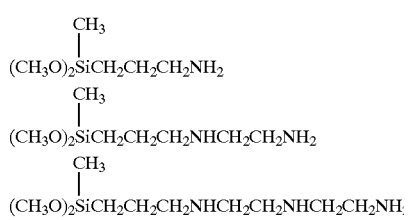

Where $R^2$ stands for groups of formula (3), those groups wherein $R^5$ and $R^8$ are hydrogen atoms are preferred because of a high catalytic activity in reaction with component (A). Methyl is most preferred as $R^1$. Methoxy is most preferred as $R^3$ because it facilitates alcohol-removing reaction. Illustrative examples of such organosilanes are given below.

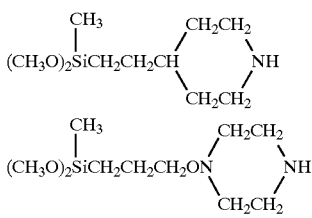

Where $R^2$ stands for groups of formula (4), those groups wherein $R^5$ and $R^8$ are hydrogen atoms are preferred because of a high catalytic activity in reaction with component (A). Methyl is most preferred as $R^1$. Methoxy is most preferred as $R^3$ because it facilitates alcohol-removing reaction. An illustrative example of such organosilanes is given below.

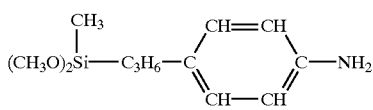

Where $R^2$ in formula (6) stands for groups of formulae (2) to (4), it is preferred that $R^5$ and $R^6$ be hydrogen or monovalent $C_{1-8}$ hydrocarbon groups such as alkyl or phenyl.

The conditions for reaction between components (A) and (B) generally include a temperature of about 50 to 180° C. and a time of about 3 to 20 hours although the conditions depend on the reactivity of silanol in component (A) and the reactivity of organoxy group, especially alkoxy group in component (B). By this reaction, a nitrogen atom-containing polysiloxane as represented by formula (1) is readily obtained. Since the alcohol by-product precludes the progress of reaction, reaction must be effected under a nitrogen stream while removing the resultant alcohol. No solvent is generally necessary although a solvent such as toluene or xylene may be used if component (A) has a high viscosity. If the reaction is slow, a catalyst such as triethylamine or tetramethylene ethylenediamine is optionally used.

The molar ratio of component (A) to component (B) used is preferably $0.5 \leq (A)/(B) \leq 1.0$, and more preferably $0.6 \leq (A)/(B) \leq 1.0$. If the molar ratio (A)/(B) is more than 1.0, an excess of the nitrogen atom-free polysiloxane may be left behind. If (A)/(B) is less than 0.5, the dialkoxysilane reactant may be left behind.

When reaction is effected at $(A)/(B) > 0.5$, a nitrogen atom-containing polysiloxane having a nitrogen atom-containing group at one terminus and a silanol group left at the other terminus is obtainable as part of the product. This polysiloxane has relatively rich reactivity and forms a firmer bond with fibers, thus providing satisfactory softness, long-term softness retention and durability of home laundering. When storage in polysiloxane form is necessary, however, the same polysiloxane undergoes a viscosity rise over time under certain storage conditions. Accordingly, if necessary, the other terminus of the polysiloxane is converted into a non-functional or relatively less functional group such as a trimethylsilyl or dimethylmethoxysilyl group by reacting the polysiloxane with a silylating agent such as trimethylsilanol or N,O-(bistrimethylsilyl)acetamide or a difunctional alkoxysilane such as dimethyldimethoxysilane. Also an alcohol or glycol compound such as methanol, ethanol, propanol or ethylene glycol may be added to the polysiloxane for suppressing a viscosity rise.

It is a common practice to modify conventional nitrogen atom-containing polysiloxanes by reacting them with organic acids, inorganic acids or epoxy compounds. This is optionally applicable to the nitrogen atom-containing polysiloxane obtained by the inventive method. For example, the nitrogen atom-containing polysiloxane is modified with organic acids, inorganic acids or epoxy compounds in order that one or two hydrogen atoms in NH or $NH_2$ be replaced by COR or $CH_2CH(OH)CH_2O(C_2H_4O)_nR^9$ wherein R is a $C_{1-10}$ alkyl group, $R^9$ is hydrogen or a monovalent hydrocarbon group (e.g., $C_{1-8}$ alkyl) and n is a positive number of 0 to 10. Examples of the organic acid used herein include formic acid, acetic acid, acetic anhydride, and propanoic acid, with acetic acid and acetic anhydride being preferred. Examples of the inorganic acid used herein include hydrochloric acid and phosphoric acid. Examples of the epoxy compound are those of the following general formula (7).

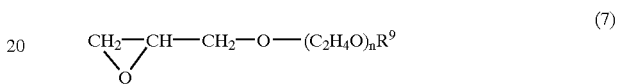

Herein $R^9$ is hydrogen or a monovalent hydrocarbon group (e.g., $C_{1-8}$ alkyl) and n is a positive number of 0 to 10. $R^9$ is preferably hydrogen or butyl.

Second Embodiment

In the second embodiment, the nitrogen atom-containing polysiloxane contains at least one unit represented by the general formula (11).

Herein $R^1$ is a nitrogen-free, substituted or unsubstituted, monovalent organic group of 1 to 20 carbon atoms, $R^2$ is independently a monovalent organic group containing at least one nitrogen atom, $R^3$ is an organoxy group represented by $-OR^1$, and p is a positive number of 2 to 2,000.

The nitrogen atom-containing polysiloxane containing at least one unit of formula (11) may have any desired terminal group selected from, for example, among dialkylhydroxysilyl, trialkylsilyl, alkyldialkoxysilyl, and dialkylalkoxy groups. Of these, dialkylhydroxysilyl, trialkylsilyl, and alkyldialkoxysilyl groups are preferred from the stability standpoint. Those groups of the following general formula (12) or (12') are especially preferred.

In the polysiloxane terminus represented by formula (12) or (12'), $R^1$, $R^2$ and $R^3$ are as defined for formula (11). Illustrative examples of the organic groups represented by $R^1$ and $R^2$ are as previously described in conjunction with the first embodiment. $R^2$ preferably stands for monovalent organic groups of the formulae (2), (3) and (4) wherein $R^4$ to $R^8$ and "a" are as previously described. Also, $R^3$ and p are as previously described in conjunction with the first embodiment.

Where $R^2$ stands for groups of formula (2), those groups wherein $R^6$ is H are preferred because of a high catalytic activity in reaction with component (A). Methoxy is most preferred as $R^3$ because it facilitates alcohol-removing reaction. Illustrative examples of such terminal groups are given below.

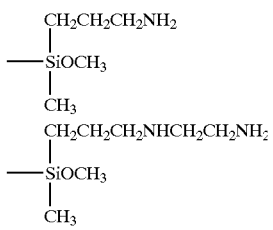

The polysiloxane in the second embodiment is typically represented by the following general formula (II).

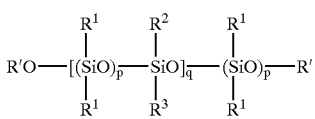
(II)

Herein, R' is H, —$SiR^1_3$, —$SiR^1_2R^3$, —$SiR^1R^3_2$ or —$SiR^1R^2R$, two R' groups may be the same or different, and q is a number of 1 to 30, and especially equal to 1, 2 or 3.

Illustrative examples of the nitrogen atom-containing polysiloxane containing at least one unit of formula (11) are given below.

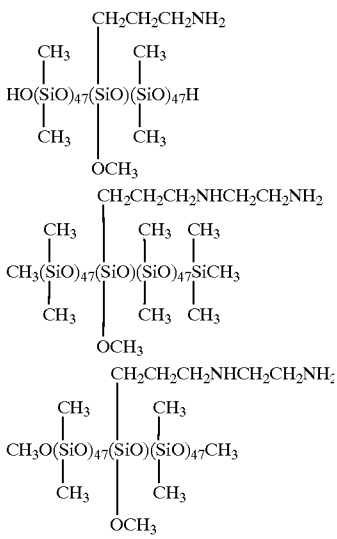

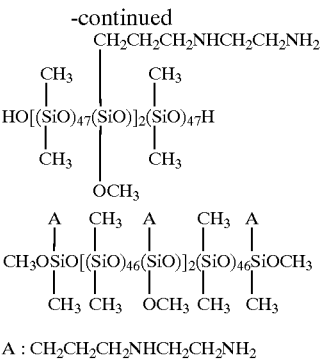

A : $CH_2CH_2CH_2NHCH_2CH_2NH_2$

Also included are substituted ones of these illustrative compounds in which one or two hydrogen atoms in NH or $NH_2$ are replaced by COR wherein R is a $C_{1-10}$ alkyl group and in which one or two hydrogen atoms in NH or $NH_2$ are replaced by $CH_2CH(OH)CH_2O(C_2H_4O)_nR^9$ wherein $R^9$ is hydrogen or a monovalent hydrocarbon group (e.g., $C_{1-8}$ alkyl) and n is a positive number of 0 to 10.

According to the invention, the nitrogen atom-containing polysiloxane of the second embodiment can be prepared by effecting alcohol-removing reaction between (A) a both end hydroxyl-blocked organopolysiloxane of the following general formula (5) and (C) a nitrogen atom-containing organosilane of the following general formula (13).

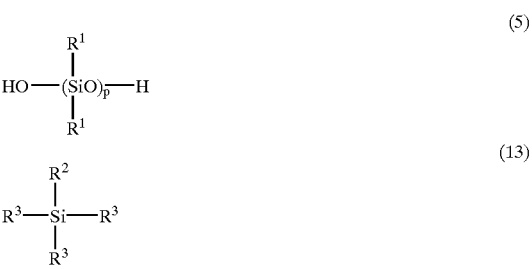

Herein $R^1$, $R^2$, $R^3$ and p are as defined above.

In formula (5), p is a positive number of 2 to 2,000 as defined above. If p is less than 2, because of unstable silanol, condensation reaction takes place parallel to the reaction with component (C), resulting in cyclic by-products. An organopolysiloxane of formula (5) in which p is greater than 2,000 is less reactive with a triorganoxy-silane of formula (13). Preferably p is from 10 to 500. $R^1$ is as defined above, and preferably at least 90 mol % of the $R^1$ groups are methyl, phenyl, and trifluoropropyl. Illustrative examples of the organopolysiloxane of formula (5) are as described in conjunction with the first embodiment.

In formula (13), $R^2$ and $R^3$ are as defined for formula (1). Where $R^2$ stands for groups of formula (2), those groups wherein $R^6$ is H are preferred because of a high catalytic activity in reaction with component (A). Methoxy is most preferred as $R^3$ because it facilitates alcohol-removing reaction. Illustrative examples of such organosilanes are given below.

$(CH_3O)_3SiCH_2CH_2CH_2NH_2$
$(CH_3O)_3SiCH_2CH_2CH_2NHCH_2CH_2NH_2$
$(CH_3O)_3SiCH_2CH_2CH_2NHCH_2CH_2NHCH_2CH_2NH_2$.

Where $R^2$ stands for groups of formula (3), those groups wherein $R^5$ and $R^8$ are hydrogen atoms are preferred because of a high catalytic activity in reaction with component (A). Methoxy is most preferred as $R^3$ because it facilitates alcohol-removing reaction. Illustrative examples of such organosilanes are given below.

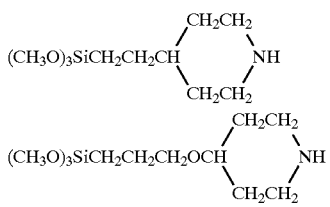

Where $R^2$ stands for groups of formula (4), those groups wherein $R^5$ and $R^8$ are hydrogen atoms are preferred because of a high catalytic activity in reaction with component (A). Methoxy is most preferred as $R^3$ because it facilitates alcohol-removing reaction. An illustrative example of such organosilanes is given below.

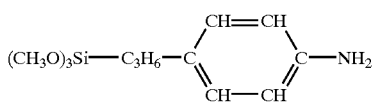

Where $R^2$ in formula (6) stands for groups of formulae (2) to (4), it is preferred that $R^5$ and $R^6$ be hydrogen or monovalent $C_{1-8}$ hydrocarbon groups such as alkyl or phenyl.

The conditions for reaction between components (A) and (C) generally include a temperature of about 50 to 180° C. and a time of about 3 to 20 hours although the conditions depend on the reactivity of silanol in component (A) and the reactivity of organoxy group, especially alkoxy group in component (C). By this reaction, a nitrogen atom-containing polysiloxane as represented by formula (11) is readily obtained. Since the alcohol by-product precludes the progress of reaction, reaction must be effected under a nitrogen stream while removing the resultant alcohol. No solvent is generally necessary although a solvent such as toluene or xylene may be used if component (A) has a high viscosity.

The molar ratio of component (A) to component (C) used is preferably $1.0<(A)/(C)\leq 4.0$, and more preferably $1.0<(A)/(C)\leq 2.0$. If the molar ratio (A)/(C) is more than 4.0, an excess of the nitrogen atom-free polysiloxane may be left behind. If (A)/(C) is less than 1.0, a polysiloxane having left therein two of the three alkoxy groups may form, detracting from aging stability.

When reaction is effected between components (A) and (C), a nitrogen atom-containing polysiloxane having a silanol group at either terminus is obtainable as a main product. This polysiloxane has relatively rich reactivity and forms a firmer bond with fibers, thus providing satisfactory softness, long-term softness retention and durability of home laundering. When storage in polysiloxane form is necessary, however, the same polysiloxane undergoes a viscosity rise over time under certain storage conditions. Accordingly, if necessary, the terminus of the polysiloxane is converted into a more stable terminus having an organoxy group of the general formula (12), especially alkoxy group by reacting the polysiloxane with a nitrogen atom-containing diorganoxysilane of the general formula (6):

wherein $R^1$, $R^2$ and $R^3$ are as defined above, and especially a dialkoxysilane. Alternatively, the terminus of the polysiloxane can be converted into a non-functional or relatively less functional group such as a trimethylsilyl or dimethylmethoxysilyl group by reacting the polysiloxane with a silylating agent such as trimethylsilanol or N,O-(bistrimethylsilyl)acetamide or a difunctional alkoxysilane such as dimethyldimethoxysilane. Also an alcohol or glycol compound such as methanol, ethanol, propanol or ethylene glycol may be added at the end of reaction for suppressing a viscosity rise.

The modification of polysiloxanes by reaction with organic acids, inorganic acids or epoxy compounds is optionally applicable to the nitrogen atom-containing polysiloxane obtained by the inventive method. For example, the nitrogen atom-containing polysiloxane is modified with organic acids, inorganic acids or epoxy compounds in order that one or two hydrogen atoms in NH or $NH_2$ be replaced by COR or $CH_2CH(OH)CH_2O(C_2H_4O)_nR^9$ wherein R is a $C_{1-10}$ alkyl group, $R^9$ is hydrogen or a monovalent hydrocarbon group (e.g., $C_{1-8}$ alkyl) and n is a positive number of 0 to 10. Examples of the organic acid used herein include formic acid, acetic acid, acetic anhydride, and propanoic acid, with acetic acid and acetic anhydride being preferred. Examples of the inorganic acid used herein include hydrochloric acid and phosphoric acid. Examples of the epoxy compound are those of the formula (7).

Composition

The fiber and fabric finishing agent composition of the invention contains a nitrogen atom-containing organopolysiloxane of the first or second embodiment as a main component. The composition may take the form of solutions of the polysiloxane in organic solvents such as toluene, xylene, n-hexane, n-heptane, methyl ethyl ketone, methyl isobutyl ketone, ethyl acetate, butyl acetate, and mineral turpentine, or emulsions of the polysiloxane with the aid of nonionic, anionic, cationic or ampholytic surfactants. The emulsifier used herein is not critical. Exemplary nonionic surfactants include ethoxylated higher alcohols, ethoxylated alkylphenols, polyhydric alcohol fatty acid esters, ethoxylated polyhydric alcohol fatty acid esters, ethoxylated fatty acids, ethoxylated fatty acid amides, sorbitol, sorbitan fatty acid esters, ethoxylated sorbitan fatty acid esters, and sucrose fatty acid esters. They preferably have a HLB in the range of 5 to 20, and especially 10 to 16. Exemplary anionic emulsifiers include higher alcohol sulfuric acid ester salts, alkyl phenyl ether sulfuric acid ester salts, alkylbenzenesulfonic acid salts, higher alcohol phosphoric acid ester salts, ethoxylated higher alcohol sulfuric acid ester salts, ethoxylated alkyl phenyl ether sulfuric acid ester salts, and ethoxylated higher alcohol phosphoric acid salts. Exemplary cationic emulsifiers include alkyltrimethylammonium chlorides, alkylamine hydrochloride salts, coconut amine acetate, alkylamine acetate, and alkylbenzenedimethylammonium chloride. Exemplary ampholytic surfactants include N-acylamidopropyl-N,N-dimethylammoniobetains, and N-acylamidopropyl-N,N'-dimethyl-N'-β-hydroxypropylammoniobetains. An appropriate amount of the surfactant used is about 5 to 50 parts and more preferably about 10 to 30 parts by weight per 100 parts by weight of the organopolysiloxane. On emulsification, water is preferably used in such amounts that the organopolysiloxane may be present in a concentration of 10 to 80% and preferably 20 to 60% by weight.

The emulsion may be prepared by conventional well-known techniques. Usually the organopolysiloxane and a surfactant are mixed and this mixture is emulsified by an emulsifying machine such as a homomixer, homogenizer, colloidal mill, line mixer, Universal Mixer (trade name), Ultra Mixer (trade name), Planetary Mixer (trade name), Combi-Mix (trade name) or three-roll mixer.

To the fiber and fabric finishing agent composition of the invention, suitable additives may be added insofar as the advantages of the composition are not impaired. Such additives are silicon compounds such as dimethylpoly-siloxane, αω-dihydroxydimethylpolysiloxane and alkoxy-silanes, and other additives such as anti-creasing agents, flame retardants, antistatic agents, antioxidants, preservatives, and anti-rusting agents.

Various fibers or fibrous materials are treated with the fiber and fabric finishing agent composition of the invention by adjusting the composition in emulsion form to a desired concentration, and applying the composition to fibers or fibrous material as by dipping, spraying or roll coating. The loading on fiber or fabric varies with the type of fibers and is not critical although an organopolysiloxane loading on fiber or fabric of 0.01 to 10% by weight is usually employed. The fibers or fibrous materials are then dried as by hot air blowing or in a heating oven. Drying may be effected at about 100 to 150° C. for about 2 to 5 minutes although the drying conditions vary with the type of fibers.

The fibers or fibrous materials which can be treated with the fiber and fabric finishing agent composition of the invention are not critical. It is effective to a wide spectrum of fibers including natural fibers such as cotton, silk, hemp, wool, Angora and mohair and synthetic fibers such as polyester, nylon, acrylic and spandex. The state and shape of fibers or fibrous materials are not critical. Not only raw material forms such as staples, filaments, tows, and threads, but also a variety of fibrous materials such as fabrics, knitted goods, batting, and non-woven fabrics can be treated with the fiber and fabric finishing agent composition of the invention.

EXAMPLE

Examples of the invention are given below by way of illustration and not by way of limitation. The viscosity is a measurement (centipoise) at 25° C.

Structural Analysis by $^{29}$Si-NMR

Peaks in $^{29}$Si-NMR were observed by uniformly dissolving 1.5 g of a sample and 0.04 g of tris(2,4-pentanedionate) chromium as a buffer reagent in 1.35 g of toluene and 0.15 g of benzene-d$^6$, filling a sample tube of 10 mm in diameter therewith, operating an analyzer Lambda 300WB (JEOL), and determining 600 to 3,000 times collection.

Synthetic Example 1

A 500-ml glass flask equipped with an ester adapter, condenser and thermometer was charged with 476.5 g (0.030 mol) of αω-dihydroxydimethylpolysiloxane represented by the following average structural formula (i) as component (A) and 12.4 g (0.060 mol) of N-β-(aminoethyl)-γ-aminopropyl-methyldimethoxysilane as component (B). In a nitrogen stream, reaction was effected at 120° C. for 12 hours. In the ester adapter, the distillate of methanol resulting from methanol-removing reaction was observed. At the end of reaction, the resulting product (A-1) was subject to structural identification by $^{29}$Si-NMR. The result that the peak (−2.7 ppm) of the reactant, N-β-(aminoethyl)-γ-aminopropylmethyldimethoxysilane had disappeared indicated that all the silane had reacted. The NMR chart is as shown in FIG. 1, with attribution shown in Table 1.

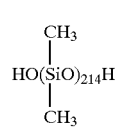

(i)

TABLE 1

| Chemical shift (ppm) | Number of silicone atoms by integration ratio | Attribution |
|---|---|---|
| −12.5 | 2.0 | CH$_2$CH$_2$CH$_2$NHCH$_2$CH$_2$NH$_2$<br>\|<br>CH$_3$OSiO—<br>\|<br>CH$_3$ |
| −22.5 | 214.0 | CH$_3$<br>\|<br>—SiO—<br>\|<br>CH$_3$ |

From the analytical results and the reaction route, the product was identified to have the following average structural formula (ii). The measurements of volatile content and rotational viscosity are shown in Table 2.

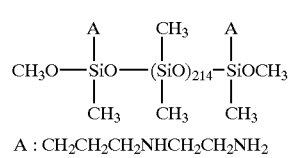

A : CH$_2$CH$_2$CH$_2$NHCH$_2$CH$_2$NH$_2$ (ii)

Synthetic Example 2

The procedure of Synthetic Example 1 was repeated except that the amount of N-β-(aminoethyl)-γ-aminopropyl-methyldimethoxysilane was changed to 6.2 g (0.030 mol). At the end of reaction, the resulting product (A-2) was subject to structural identification by $^{29}$Si-NMR. The product was identified to have the following average structural formula (iii). The measurements of volatile content and rotational viscosity are shown in Table 2.

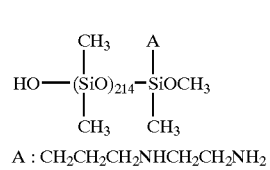

A : CH$_2$CH$_2$CH$_2$NHCH$_2$CH$_2$NH$_2$ (iii)

Synthetic Example 3

The procedure of Synthetic Example 1 was repeated except that 9.8 g (0.060 mol) of γ-aminopropylmethyldimethoxysilane was used instead of N-β-(aminoethyl)-γ-aminopropylmethyldimethoxysilane. At the end of reaction, there was obtained a viscous, colorless, clear oily product (A-3), which was subject to structural identification by $^{29}$Si-NMR. The product was identified to have the following average structural formula (iv). The measurements of volatile content and rotational viscosity are shown in Table 2.

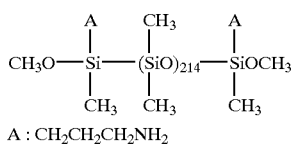

(iv)

Synthetic Example 4

The procedure of Synthetic Example 1 was repeated except that 9.9 g (0.060 mol) of 3-piperazinopropylmethyldimethoxysilane was used instead of N-β-(aminoethyl)-γ-aminopropylmethyldimethoxysilane and the reaction conditions were 120° C. and 12 hours. At the end of reaction, there was obtained a viscous, colorless, clear oily product (A-4), which was subject to structural identification by $^{29}$Si-NMR. The product was identified to have the following average structural formula (v). The measurements of volatile content and rotational viscosity are shown in Table 2.

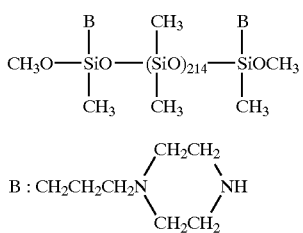

(v)

Synthetic Example 5 (Comparison)

A 2000-ml glass flask equipped with a reflux condenser and thermometer was charged with 1586.8 g (21.4 mol) of octamethylcyclotetrasiloxane and 16.0 g (0.10 mol) of 1,3,5,7-tetra[N-β-(aminoethyl)-γ-aminopropyl]-1,3,5,7-tetramethylcyclotetrasiloxane. In a nitrogen stream, the contents were dried at 120° C. for 2 hours. Then 20.6 g (0.10 mol) of N-β-(aminoethyl)-γ-aminopropylmethyldimethoxysilane and then 1.08 g (0.0020 mol) of a catalyst represented by the following average structural formula (vi) were added to the flask. Reaction was effected at 150° C. for 6 hours for polymerization. At the end of polymerization, the reaction mixture was cooled to 90° C. Ethylene chlorohydrin, 3.22 g (0.040 mol), was added to the reaction mixture whereupon reaction was effected at 90° C. for 2 hours for neutralization. At the end of reaction, there was obtained a viscous, colorless, clear oily product (A-5), which was subject to structural identification by $^{29}$Si-NMR. The product was identified to have the following average structural formula (vii). The measurements of volatile content and rotational viscosity are shown in Table 2.

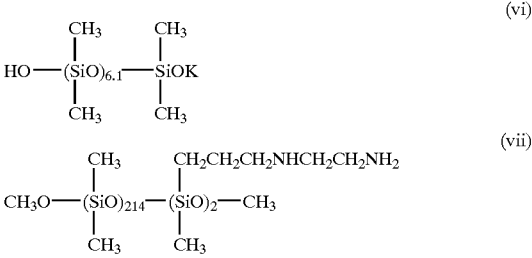

(vi)

(vii)

Synthetic Example 6

A 1000-ml glass flask equipped with an ester adapter, condenser and thermometer was charged with 344.8 g (0.10 mol) of αω-dihydroxydimethylsiloxane represented by the following average structural formula (viii) as component (A) and 41.3 g (0.20 mol) of N-β-(aminoethyl)-γ-aminopropylmethyldimethoxysilane as component (B). In a nitrogen stream, reaction was effected at 120° C. for 8 hours. In the ester adapter, the distillate of methanol resulting from methanol-removing reaction was observed. At the end of reaction, the reaction mixture was cooled to 80° C., to which 30 g of isopropyl alcohol and 204.4 g (0.60 mol) of an epoxy compound represented by the following average structural formula (ix) were added whereupon reaction was effected at 80° C. for 8 hours. By stripping under a vacuum of 5 mmHg at 120° C. for 2 hours, a colorless clear oil (A-6) having a viscosity of 1,018 cp was collected. The oil was analyzed by $^1$H-NMR, finding that all the epoxy groups had reacted. Upon structural analysis by $^{29}$Si-NMR, the oil was identified to have the following average structural formula (x). The measurements of volatile content and rotational viscosity are shown in Table 2.

(viii)

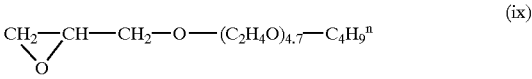

(ix)

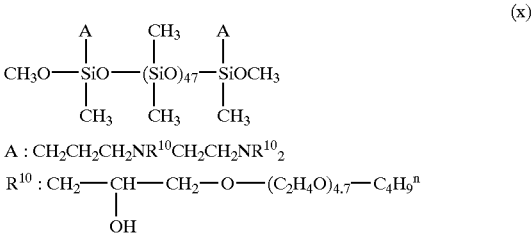

(x)

Synthetic Example 7 (Comparison)

A 1000-ml glass flask equipped with a reflux condenser and thermometer was charged with 370.8 g (5.0 mol) of octamethylcyclotetrasiloxane and 16.0 g (0.25 mol) of 1,3,5,7-tetra[N-β-(aminoethyl)-γ-aminopropyl]-1,3,5,7-tetramethylcyclotetrasiloxane. In a nitrogen stream, the contents were dried at 120° C. for 2 hours. Then 20.6 g (0.10 mol) of N-β-(aminoethyl)-γ-aminopropylmethyldimethoxysilane and then 0.54 g (0.0010 mol) of a catalyst represented by the above average structural formula (vi) were added to the flask. Reaction was effected at 150° C. for 6 hours for polymerization. At the end of polymerization, the reaction mixture was cooled to 90° C. Ethylene chlorohydrin, 1.61 g (0.020 mol), was added to the reaction mixture whereupon reaction was effected at 90° C. for 2 hours for neutralization. At the end of reaction, the reaction mixture was cooled to 80° C., to which 12 g of isopropyl alcohol and 204.2 g (0.60 mol) of an epoxy compound represented by the above average structural formula (ix) were added whereupon reaction was effected at 80° C. for 8 hours. By stripping under a vacuum of 5 mmHg at 120° C. for 2 hours, a colorless clear oil (A-7) having a viscosity of 1,018 cp was collected. The oil was analyzed by $^1$H-NMR, finding that all the epoxy groups had reacted. Upon structural analysis by $^{29}$Si-NMR, the oil was identified to have the following average structural formula (xi). The measurements of volatile content and rotational viscosity are shown in Table 2.

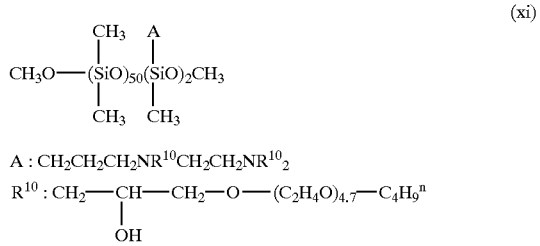

(xi)

TABLE 2

|  | SE 1 | SE 2 | SE 3 | SE 4 | SE 5 | SE 6 | SE 7 |
|---|---|---|---|---|---|---|---|
| N-containing polysiloxane | A-1 | A-2 | A-3 | A-4 | A-5 | A-6 | A-7 |
| Volatile content @ 105° C./3 hr (%) | 0.5 | 0.1 | 0.2 | 0.3 | 12.5 | 1.6 | 1.4 |
| Viscosity (cp) | 1200 | 1180 | 1150 | 1180 | 640 | 1018 | 850 |

Example 1

To 150 g of the nitrogen atom-containing polysiloxane (A-1) synthesized in Synthetic Example 1 was added 90 g of polyoxyethylene tridecyl ether (amount of ethylene oxide added=10 mol, HLB=13.6). After mixing, 150 g of deionized water was added to the mixture, which was agitated at a high speed for 15 minutes by a homomixer for effecting phase inversion. Further, 610 g of deionized water was added to the mixture, which was agitated at 2,000 rpm for 15 minutes by the homomixer for effecting dilution, yielding a milky white emulsion.

To the emulsion was added 3.0 g of a cetic acid, followed by thorough agitation and heat treatment at 80° C. for 4 hours. The solution was further diluted with deionized water to a 100- fold volume, providing a test solution.

Pieces of polyester/cotton mixed (50%/50%) broadcloth and cotton broadcloth were dipped in the test solution for 1 minute, nipped through rolls at a nip rate of 100%, dried at 100° C. for 2 minutes, and heat treated at 150° C. for 2 minutes, obtaining treated cloth pieces. The softness of polyester/cotton mixed broadcloth and the home laundering test and yellowing of cotton broadcloth were evaluated according to the criteria shown below. The results are shown in Table 3.

Example 2

A test solution was prepared as in Example 1 except that the nitrogen atom-containing polysiloxane (A-2) synthesized in Synthetic Example 2 was used instead of the polysiloxane (A-1) and the amount of acetic acid was changed to 1.35 g. Pieces of cloth were similarly treated and tested for softness, home laundering test and yellowing. The results are shown in Table 3.

Comparative Example 1

A test solution was prepared as in Example 1 except that the nitrogen atom-containing polysiloxane (A-5) synthesized in Synthetic Example 5 was used instead of the polysiloxane (A-1) and the amount of acetic acid was changed to 3.4 g. Pieces of cloth were similarly treated and tested for softness, home laundering test and yellowing. The results are shown in Table 3.

Softness:
Three experts of a panel touched the treated cloth with hands and rated for softness. It was rated "O" for good, "Δ" for somewhat unacceptable, and "X" for unacceptable.

Wash-fastness:
Before and after the treated cloth was washed 10 times under the same conditions, it was examined for water repellency. It was rated "O" for good, "Δ" for somewhat unacceptable, and "X" for unacceptable.

Yellowing:
Relative evaluation of yellowness was made by measuring b value by means of a differential colorimeter ZE2000 (Nippon Denshoku Kogyo K. K.). The treated cloth was rated "O" for good with little yellowing and "Δ" for poor with noticeable yellowing.

TABLE 3

|  |  | Softness | | | home | |
|---|---|---|---|---|---|---|
|  | N-containing polysiloxane | Panelist A | Panelist B | Panelist C | laundering test | Yellowing |
| Example 1 | (A-1) | O | O | O | O | O |
| Example 2 | (A-2) | O | O | Δ | Δ | O |
| Comparative Example 1 | (A-5) | Δ | Δ | Δ | X | Δ |

Example 3

To 300 g of the nitrogen atom-containing polysiloxane (A-6) synthesized in Synthetic Example 6 was added 50 g of polyoxyethylene tridecyl ether (amount of ethylene oxide added=10 mol, HLB=13.6). After mixing, 100 g of deionized water was added to the mixture, which was agitated at a high speed for 15 minutes by a homomixer for effecting phase inversion. Further, 550 g of deionized water was added to the mixture, which was agitated at 2,000 rpm for 15 minutes by the homomixer for effecting dilution, yielding a clear micro-emulsion. The solution was further diluted with deionized water to a 68-fold volume, providing a test solution.

A treating solution was prepared by adding 147.8 g of deionized water to 2.2 g of the emulsion. Pieces of polyester/cotton mixed (50%/150%) broadcloth (for softness evaluation) and fluorescent dye-treated cotton broadcloth (for yellowing evaluation) were dipped in the test solution for 2 minutes, nipped through rolls at a nip rate of 100%, dried at 100° C. for 2 minutes, and heat treated at 150° C. for 2 minutes, obtaining treated cloth pieces. For yellowing evaluation, the cloth pieces were further heat treated at 200° C. for 2 minutes.

The treated cloth pieces were evaluated for softness and yellowing according to the criteria shown above. They were also evaluated for home laundering test according to the criterion shown below. The results are shown in Table 4.

Comparative Example 2

A test solution was prepared as in Example 6 except that the nitrogen atom-containing polysiloxane (A-7) synthesized in Synthetic Example 7 was used instead of the polysiloxane (A-6). Pieces of cloth were similarly treated and tested for softness, home laundering test and yellowing. The results are shown in Table 4.

Home Laundering Test:

The treated cloth was washed once under the same conditions. Three experts of a panel examined the cloth for softness. It was rated "O" for good, "Δ" for somewhat unacceptable, and "X" for unacceptable.

TABLE 4

|  | N-containing polysiloxane | Softness | | | Home laundering test | | | Yellow-ing |
|---|---|---|---|---|---|---|---|---|
|  |  | Panelist A | Panelist B | Panelist C | Panelist A | Panelist B | Panelist C |  |
| Example 3 | (A-6) | O | O | O | O | O | Δ | O |
| Comparative Example 2 | (A-7) | Δ | Δ | Δ | Δ | Δ | X | Δ |

Synthetic Example 8

Figure 2:
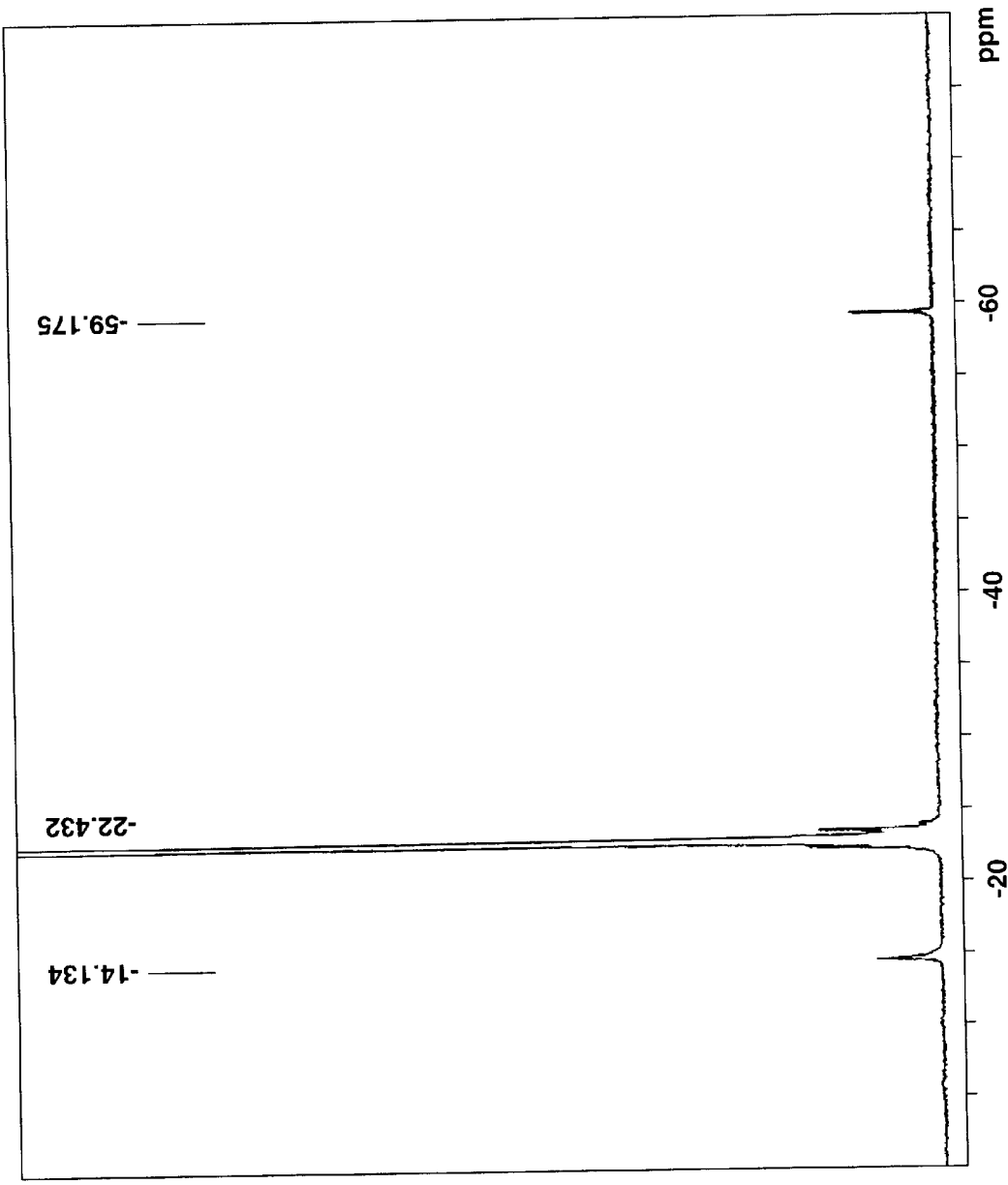
FIG. 2 is an NMR spectrum of the compound obtained in Synthetic Example 8.

A 500-ml glass flask equipped with a mechanical agitator blade, ester adapter, condenser and thermometer was charged with 275.9 g (0.080 mol) of α,ω-dihydroxy-dimethylpolysiloxane represented by the following average structural formula (xii) as component (A) and 8.9 g (0.040 mol) of N-β-(aminoethyl)-γ-aminopropyltrimethoxysilane as component (C). In a nitrogen stream, reaction was effected at 120° C. for 8 hours. In the ester adapter, the distillate of methanol resulting from methanol-removing reaction was observed, and a viscosity rise of the reaction solution was also observed. At the end of reaction, there was obtained a viscous colorless clear oily product. The product was subject to structural identification by $^{29}$Si-NMR. The NMR chart is as shown in FIG. 2, with attribution shown in Table 5.

$$\text{HO}(\overset{\overset{\displaystyle CH_3}{|}}{\underset{\underset{\displaystyle CH_3}{|}}{Si}O})_{47}H \quad \text{(xii)}$$

TABLE 5

| Chemical shift (ppm) | Number of silicone atoms by integration ratio | Attribution |
|---|---|---|
| −14.1 | 2.0 | 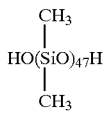 |

TABLE 5-continued

| Chemical shift (ppm) | Number of silicone atoms by integration ratio | Attribution |
|---|---|---|
| −22.4 | 94.0 | CH₃<br>\|<br>—SiO—<br>\|<br>CH₃ |

TABLE 5-continued

| Chemical shift (ppm) | Number of silicone atoms by integration ratio | Attribution |
|---|---|---|
| −59.2 | 1.0 | CH₂CH₂CH₂NHCH₂CH₂NH₂<br>\|<br>—SiO—<br>\|<br>OCH₃ |

From the analytical results and the reaction route, the product was identified to have the following average structural formula (xiii). The measurements of volatile content and rotational viscosity are shown in Table 8.

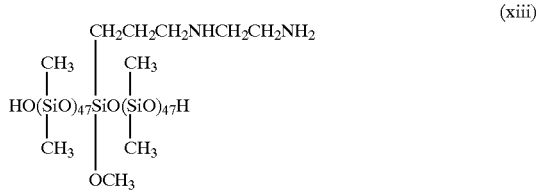

Synthetic Example 9

A 500-ml glass flask equipped with an ester adapter, condenser and thermometer was charged with 275.9 g (0.080 mol) of α,ω-dihydroxydimethylpolysiloxane represented by the above average structural formula (xii) as component (A) and 8.9 g (0.040 mol) of N-β-(aminoethyl)-γ-aminopropyl-trimethoxysilane as component (C). In a nitrogen stream, reaction was effected at 120° C. for 8 hours. In the ester adapter, the distillate of methanol resulting from methanol-removing reaction was observed, and a viscosity rise of the reaction solution was also observed. Then, 16.5 g (0.080 mol) of γ-aminopropylmethyldimethoxysilane was added to the reaction solution, whereupon reaction was effected at 120° C. for 10 hours in a nitrogen stream. At the end of reaction, there was obtained a viscous colorless clear oily product. The product was subject to structural identification by $^{29}$Si-NMR. It was identified to have the following average structural formula (xiv). The measurements of volatile content and rotational viscosity are shown in Table 8.

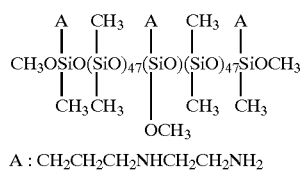

(xiv)

A : CH$_2$CH$_2$CH$_2$NHCH$_2$CH$_2$NH$_2$

Synthetic Example 10

Figure 3:
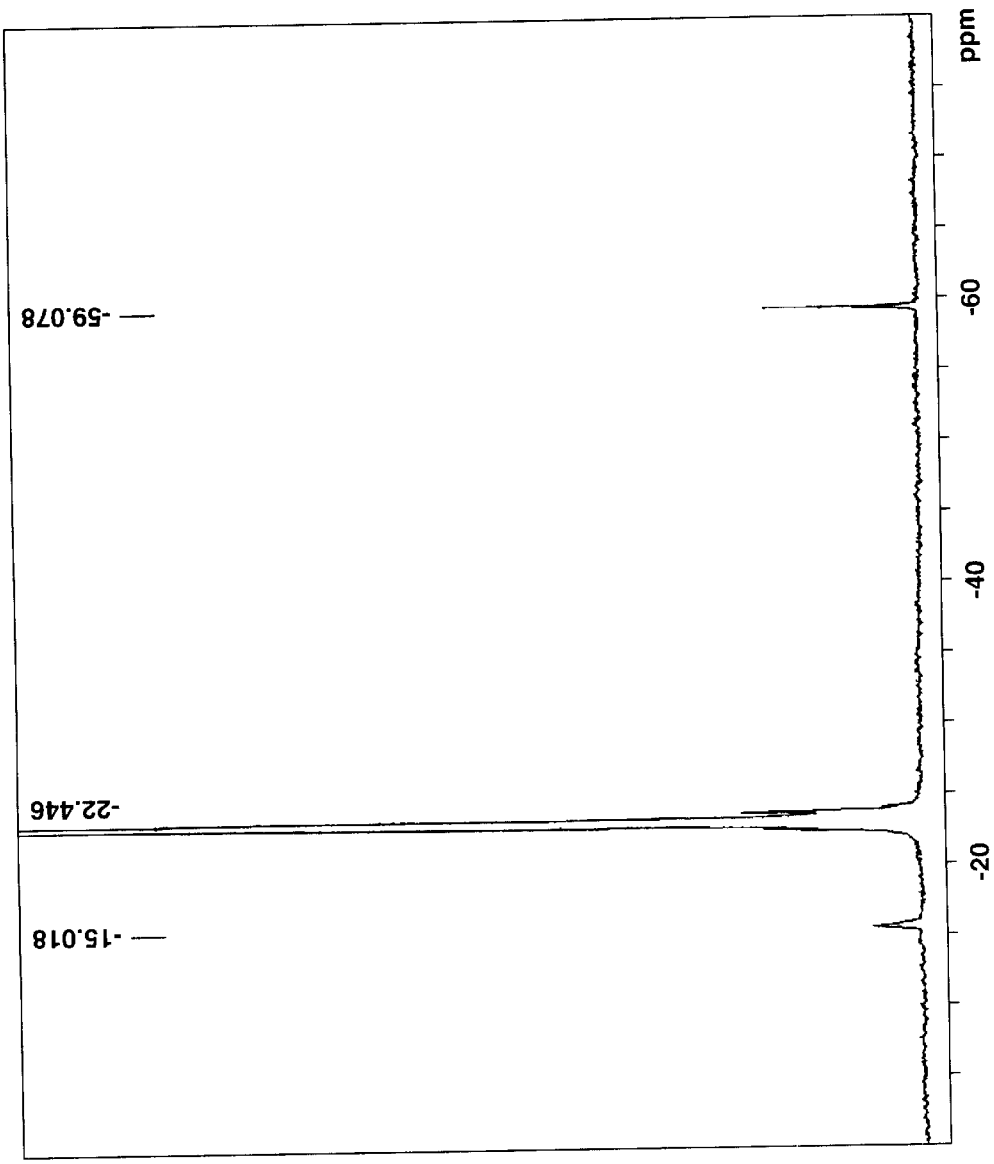
FIG. 3 is an NMR spectrum of the compound obtained in Synthetic Example 10.

The procedure of Synthetic Example 8 was repeated except that 289.6 g (0.084 mol) of α,ω-dihydroxy-dimethylpolysiloxane and 14.0 g (0.063 mol) of N-β-(aminoethyl)-γ-aminopropyltrimethoxysilane were used. At the end of reaction, there was obtained a viscous colorless clear oily product (A-8). The product was subject to structural identification by $^{29}$Si-NMR. The NMR chart is as shown in FIG. 3, with attribution shown in Table 6.

TABLE 6

| Chemical shift (ppm) | Number of silicone atoms by integration ratio | Attribution |
|---|---|---|
| −15.0 | 2.0 | CH$_3$<br>\|<br>HOSiO——<br>\|<br>CH$_3$ |
| −22.4 | 188.0 | CH$_3$<br>\|<br>——SiO——<br>\|<br>CH$_3$ |
| −59.1 | 3.0 | CH$_2$CH$_2$CH$_2$NHCH$_2$CH$_2$NH$_2$<br>\|<br>——SiO——<br>\|<br>OCH$_3$ |

From the analytical results and the reaction route, the product was identified to have the following average structural formula (xv). The measurements of volatile content and rotational viscosity are shown in Table 8.

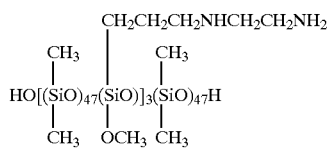

(xv)

Synthetic Example 11

Figure 4:
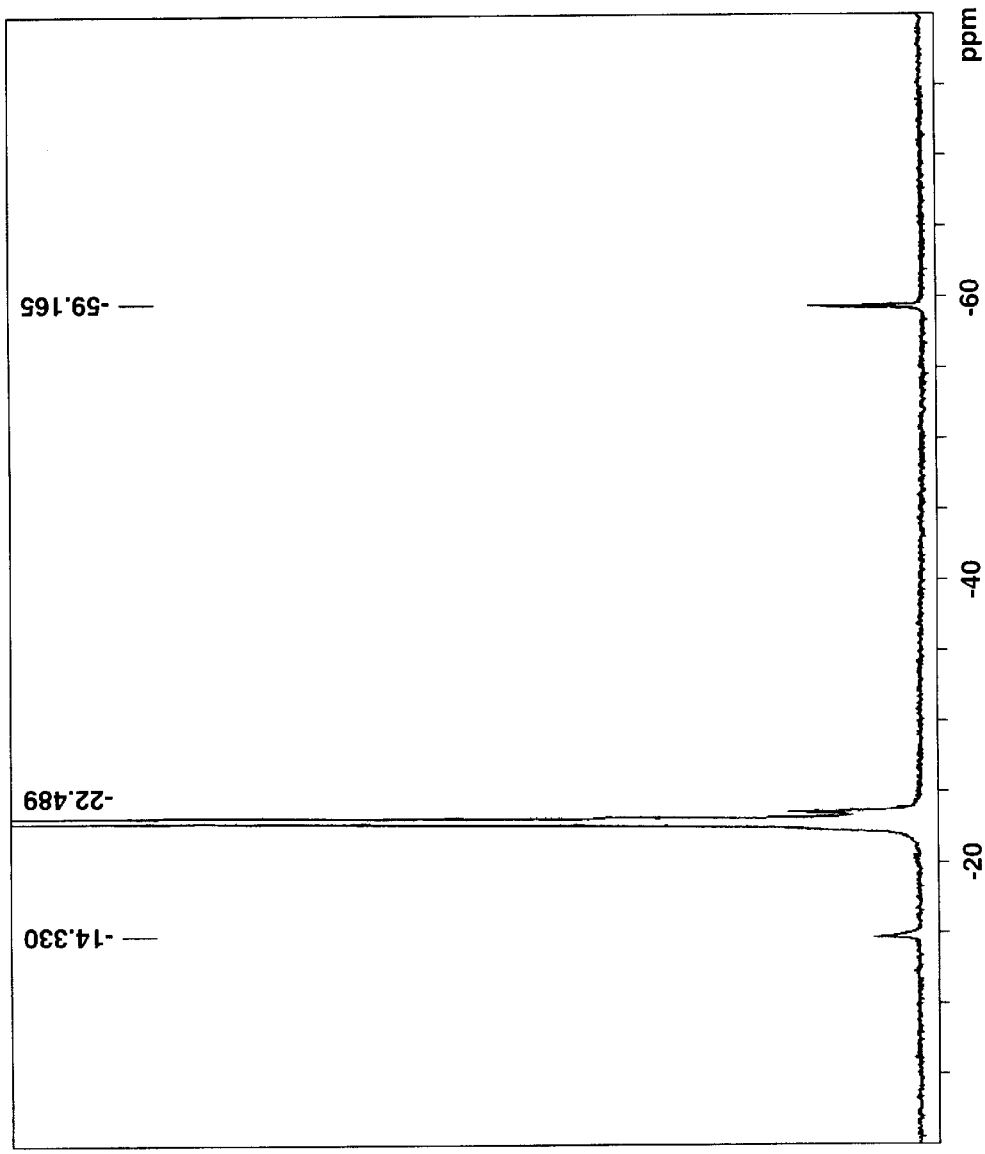
FIG. 4 is an NMR spectrum of the compound obtained in Synthetic Example 11.

The procedure of Synthetic Example 10 was repeated except that 11.3 g (0.063 mol) of γ-aminopropyltrimethoxysilane was used instead of N-β-(aminoethyl)-γ-aminopropyl-trimethoxysilane and reaction was effected at 120° C. for 16 hours. At the end of reaction, there was obtained a viscous colorless clear oily product. The product was subject to structural identification by $^{29}$Si-NMR. The NMR chart is as shown in FIG. 4, with attribution shown in Table 7.

TABLE 7

| Chemical shift (ppm) | Number of silicone atoms by integration ratio | Attribution |
|---|---|---|
| −14.3 | 2.0 | CH$_3$<br>\|<br>HOSiO——<br>\|<br>CH$_3$ |
| −22.5 | 188.0 | CH$_3$<br>\|<br>——SiO——<br>\|<br>CH$_3$ |
| −59.2 | 3.0 | CH$_2$CH$_2$CH$_2$NH$_2$<br>\|<br>——SiO——<br>\|<br>OCH$_3$ |

From the analytical results and the reaction route, the product was identified to have the following average structural formula (xvi). The measurements of volatile content and rotational viscosity are shown in Table 8.

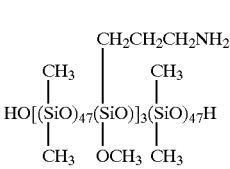

(xvi)

Synthetic Example 12

The procedure of Synthetic Example 8 was repeated except that 9.9 g (0.040 mol) of 3-piperazinopropyl-trimethoxysilane was used instead of N-β-(aminoethyl)-γ-aminopropyltrimethoxysilane and reaction was effected at 120° C. for 12 hours. At the end of reaction, there was obtained a viscous colorless clear oily product. The product was subject to structural identification by $^{29}$Si-NMR. The product was identified to have the following average structural formula (xvii). The measurements of volatile content and rotational viscosity are shown in Table 8.

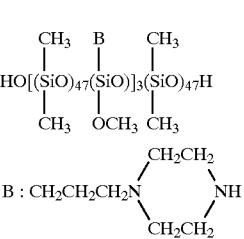

(xvii)

Synthetic Example 13 (Comparison)

The procedure of Synthetic Example 8 was repeated except that 8.3 g (0.040 mol) of N-β-(aminoethyl)-γ-aminopropylmethyldimethoxysilane was used instead of N-β-(aminoethyl)-γ-aminopropyltrimethoxysilane. At the end of reaction, there was obtained a viscous colorless clear oily product. A viscosity rise as in Synthetic Example 8 did not occur. The product was subject to structural identification by $^{29}$Si-NMR, finding that the number of silicon atoms per molecule was 65, which indicated incomplete reaction. The measurements of volatile content and rotational viscosity are shown in Table 8.

TABLE 8

|  | SE 8 | SE 9 | SE 10 | SE 11 | SE 12 | SE 13 (Comparison) |
|---|---|---|---|---|---|---|
| Volatile content @ 105° C./3 hr (%) | 0.3 | 0.3 | 0.3 | 0.4 | 0.3 | 0.6 |
| Viscosity (cp) | 365 | 325 | 893 | 342 | 340 | 133 |
| Average number of silicon atoms per molecule | 95 | 97 | 195 | 95 | 93 | 65 |

Synthetic Example 14

A 1000-ml glass flask equipped with a mechanical agitator blade, ester adapter, condenser and thermometer was charged with 401.6 g (0.20 mol) of α,ω-dihydroxydimethylpolysiloxane represented by the following average structural formula (xviii) as component (A) and 22.2 g (0.10 mol) of N-β-(aminoethyl)-γ-aminopropyltrimethoxysilane as component (C). In a nitrogen stream, reaction was effected at 120° C. for 8 hours. In the ester adapter, the distillate of methanol resulting from methanol-removing reaction was observed. At the end of reaction, the reaction mixture was cooled to 80° C., to which 40 g of isopropyl alcohol and 104.4 g (0.30 mol) of an epoxy compound represented by the following average structural formula (xix) were added whereupon reaction was effected at 80° C. for 8 hours. By stripping under a vacuum of 5 mmHg at 120° C. for 2 hours, a colorless clear oil having a viscosity of 310 cp was collected. The oil was analyzed by $^1$H-NMR, finding that all the epoxy groups had reacted. Upon structural analysis by $^{29}$Si-NMR, the oil was identified to have the following average structural formula (xx).

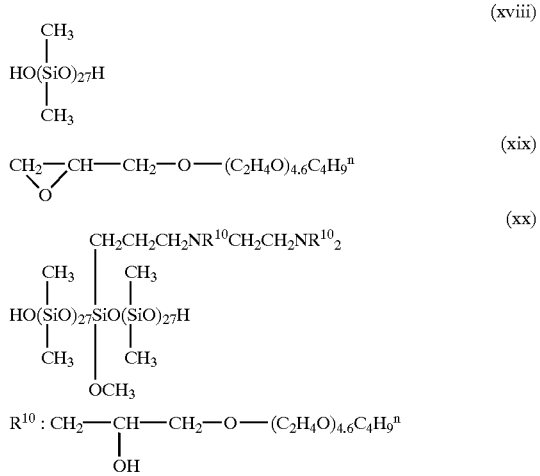

Synthetic Example 15 (Comparison)

A 2000-ml glass flask equipped with a reflux condenser and thermometer was charged with 1423.7 g (19.2 mol) of octamethylcyclotetrasiloxane and 32.1 g (0.20 mol) of 1,3, 5,7-tetra[N-β-(aminoethyl)-γ-aminopropyl]-1,3,5,7-tetramethylcyclotetrasiloxane. In a nitrogen stream, the contents were dried at 120° C. for 2 hours. Then 20.6 g (0.10 mol) of N-β-(aminoethyl)-γ-aminopropylmethyldimethoxysilane and then 1.08 g (0.0020 mol) of a catalyst represented by the following average structural formula (xxi) were added to the flask. Reaction was effected at 150° C. for 6 hours for polymerization. At the end of polymerization, the reaction mixture was cooled to 90° C. Ethylene chlorohydrin, 3.22 g (0.040 mol), was added to the reaction mixture whereupon reaction was effected at 90° C. for 2 hours for neutralization. At the end of reaction, there was obtained a viscous, colorless, clear oily product (A-9), which was subject to structural identification by $^{29}$Si-NMR. The product was identified to have the following average structural formula (xxii).

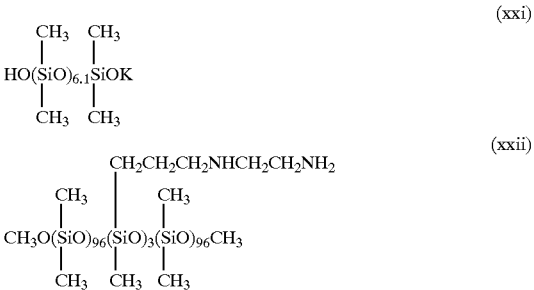

Example 4

To 150 g of the nitrogen atom-containing polysiloxane (A-8) synthesized in Synthetic Example 10 was added 90 g of polyoxyethylene tridecyl ether (amount of ethylene oxide added=10 mol, HLB=13.6). After mixing, 160 g of deionized water was added to the mixture, which was agitated at a high speed for 15 minutes by a homomixer for effecting phase inversion. Further, 600 g of deionized water was added to the mixture, which was agitated at 2,000 rpm for 15 minutes by the homomixer for effecting dilution, yielding a milky white emulsion.

To the emulsion was added 5.69 g of acetic acid, followed by thorough agitation and heat treatment at 80° C. for 4 hours. A clear micro-emulsion was obtained. The emulsion was further diluted with deionized water to a 100-fold volume, providing a test solution.

Pieces of polyester/cotton mixed (50%/50%) broadcloth and cotton broadcloth were dipped in the test solution for 1 minute, nipped through rolls at a nip rate of 100%, dried at 100° C. for 2 minutes, and heat treated at 150° C. for 2 minutes, obtaining treated cloth pieces. The softness of polyester/cotton mixed broadcloth and the wash-fastness of cotton broadcloth were evaluated according to the criteria shown below. The results are shown in Table 9.

Comparative Example 3

A test solution was prepared as in Example 4 except that the nitrogen atom-containing polysiloxane (A-9) synthesized in Synthetic Example 15 was used instead of the polysiloxane (A-8). Pieces of cloth were similarly treated and tested for softness and home laundering test. The results are shown in Table 9.

Softness:

Three experts of a panel touched the treated cloth with hands and rated for softness. It was rated "O" for good, "Δ" for somewhat unacceptable, and "X" for unacceptable.

Home Laundering Test:

Before and after the treated cloth was washed 10 times under the same conditions, it was examined for water repellency. It was rated "O" for good, "Δ" for somewhat unacceptable, and "X" for unacceptable.

TABLE 9

|  | N-containing polysiloxane | Softness Panelist A | Panelist B | Panelist C | Home laundering test Initial | After washing |
|---|---|---|---|---|---|---|
| Example 4 | (A-8) | O | O | O | O | Δ |
| Comparative Example 3 | (A-9) | Δ | Δ | X | O | X |

Japanese Patent Application Nos. 11-180093 and 11-180094 are incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A fiber and fabric finishing agent composition primarily comprising a nitrogen atom-containing polysiloxane comprising at least one unit of the formula (11):

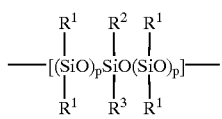

(11)

wherein $R_1$ is a nitrogen-free, substituted or unsubstituted, monovalent organic group of 1 to 20 carbon atoms, $R^2$ is independently a monovalent organic group containing at least one nitrogen atom, $R^3$ is an alkoxy group of 1 to 6 carbon atoms, and p is a positive number of 2 to 2,000, wherein the composition further comprises a nonionic, anionic, cationic or ampholytic surfactant.

2. The fiber and fabric finishing agent composition of claim 1 wherein the nitrogen atom-containing polysiloxane has a terminus of the formula (12):

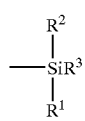

(12)

wherein $R^1$, $R^2$, and $R^3$ are as defined above.

3. The fiber and fabric finishing agent composition of claim 1 wherein the nitrogen atom-containing polysiloxane has a terminus of the formula (12'):

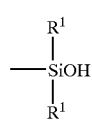

(12')

wherein $R^1$ is as defined above.

4. The fiber and fabric finishing agent composition of claim 1 wherein $R^2$ is a monovalent organic group of the formula (2):

$$-R^4(NR^5CH_2CH_2)_aNR^6{}_2 \quad (2)$$

wherein $R^4$ is a divalent hydrocarbon group of 1 to 6 carbon atoms, $R^5$ and $R^6$ are independently selected from hydrogen and unsubstituted or hydroxyl-substituted monovalent hydrocarbon groups of 1 to 50 carbon atoms which may be separated by an oxygen atom, and a is an integer of 0 to 4.

5. The fiber and fabric finishing agent composition of claim 1 wherein $R^2$ is a monovalent organic group of the formula (3):

(3)

wherein $R^4$ is a divalent hydrocarbon group of 1 to 6 carbon atoms, $R^7$ is selected from the group consisting of —CH=, —N=, —OCH=, and —ON=, $R^5$ is hydrogen or a monovalent hydrocarbon group of 1 to 8 carbon atoms, and $R^8$ is hydrogen or methyl.

6. The fiber and fabric finishing agent composition of claim 1 wherein $R^2$ is a monovalent organic group of the formula (4):

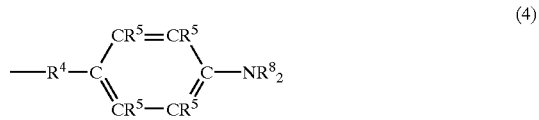

(4)

wherein $R^4$ is a divalent hydrocarbon group of 1 to 6 carbon atoms, $R^5$ is hydrogen or a monovalent hydrocarbon group of 1 to 8 carbon atoms, and $R^8$ is hydrogen or methyl.

7. The fiber and fabric finishing composition of claim 1, wherein the composition further comprises an organic solvent.

8. The fiber and fabric finishing agent composition of claim 1 wherein said nitrogen atom-containing polysiloxane is prepared by:

effecting an alcohol-removing reaction between (A) an organopolysiloxane of the formula (5):

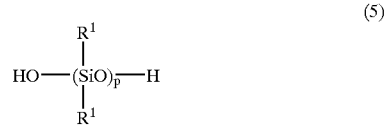

(5)

wherein $R^1$ is a nitrogen-free, substituted or unsubstituted, monovalent organic group of 1 to 20 carbon atoms and p is a positive number of 2 to 2,000, and (C) an organosilane of the formula (13):

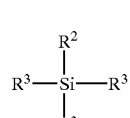

(13)

wherein $R^2$ is a monovalent organic group containing at least one nitrogen atom and $R^3$ is an organoxy group represented by —$OR^1$.

9. The composition of claim 8 wherein the molar ratio of components (A) to (C) is 1.0<(A)/(C)≦4.0 in the alcohol removing reaction.

10. A nitrogen atom-containing polysiloxane comprising at least one unit of the formula (11):

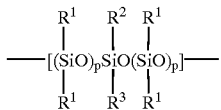
(11)

wherein $R^1$ is a nitrogen-free, substituted or unsubstituted, monovalent organic group of 1 to 20 carbon atoms, $R^2$ is independently a monovalent organic group containing at least one nitrogen atom, $R^3$ is an organoxy group represented by —$OR^1$, and p is a positive number of 2 to 2,000 having a terminus represented by the general formula (12'):

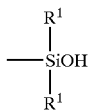
(12')

wherein $R^1$ is as defined above.

11. The nitrogen atom-containing polysiloxane of claim 10 wherein $R^2$ is a monovalent organic group of the formula (2):

—$R^4(NR^5CH_2CH_2)_aNR^6_2$ (2)

wherein $R^4$ is a divalent hydrocarbon group of 1 to 6 carbon atoms, $R^5$ and $R^6$ are independently selected from hydrogen and unsubstituted or hydroxyl-substituted monovalent hydrocarbon groups of 1 to 50 carbon atoms which may be separated by an oxygen atom, and a is an integer of 0 to 4.

12. The nitrogen atom-containing polysiloxane of claim 11 wherein $R^2$ is —$C_3H_6NH_2$, —$C_3H_6NHC_2H_4NH_2$, or —$C_3H_6NHC_2H_4NHC_2H_4NH_2$.

13. A nitrogen atom-containing polysiloxane comprising at least one unit of formula (11):

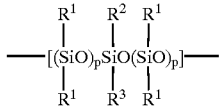
(11)

wherein $R^1$ is a nitrogen-free, substituted or unsubstituted, monovalent organic group of 1 to 20 carbon atoms, $R^2$ is independently a monovalent organic group containing at least one nitrogen atom, $R^3$ is an organoxy group represented by —$OR^1$, and p is a positive number of 2 to 2,000 and having a terminus represented by the general formula (12):

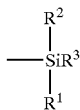
(12)

wherein $R^1$, $R^2$ and $R^3$ are as defined above.

14. The nitrogen atom-containing polysiloxane of claim 13, wherein $R^2$ is a monovalent organic group represented by the general formula (2):

—$R^4(NR^5CH_2CH_2)_aNR^6_2$ (2)

wherein $R^4$ is a divalent hydrocarbon group of 1 to 6 carbon atoms, $R^5$ and $R^6$ are independently selected from hydrogen and unsubstituted or hydroxyl-substituted monovalent hydrocarbon groups of 1 to 50 carbon atoms which may be separated by an oxygen atom, and a is an integer of 0 to 4.

15. The nitrogen atom-containing polysiloxane of claim 14 wherein $R^2$ is —$C_3H_6NH_2$, —$C_3H_6NHC_2H_4NH_2$, or —$C_3H_6NHC_2H_4NHC_2H_4NH_2$.

16. The nitrogen atom-containing polysiloxane of claim 13, wherein $R^2$ is a monovalent organic group represented by the general formula (3):

(3)

wherein $R^4$ is a divalent hydrocarbon group of 1 to 6 carbon atoms, $R^7$ is selected from the group consisting of —CH═, —N═, —OCH═, and —ON═, $R^5$ is hydrogen or a monovalent hydrocarbon group of 1 to 8 carbon atoms, and $R^8$ is hydrogen or methyl.

17. The nitrogen atom-containing polysiloxane of claim 13, wherein $R^2$ is a monovalent organic group represented by the general formula (4):

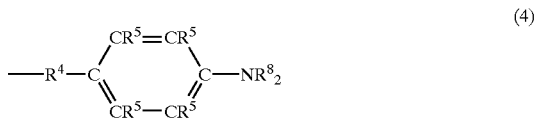
(4)

wherein $R^4$ is a divalent hydrocarbon group of 1 to 6 carbon atoms, $R^5$ is hydrogen or a monovalent hydrocarbon group of 1 to 8 carbon atoms, and $R^8$ is hydrogen or methyl.

18. A method for preparing a nitrogen atom-containing polysiloxane as set forth in claim 13, comprising: effecting an alcohol-removing reaction between (A) an organopolysiloxane of the formula (5):

(5)

wherein $R^1$ and p are as defined above and (C) an organosilane of the formula (13):

(13)

wherein $R^2$ and $R^3$ are as defined above, and further comprising reacting the reaction product between components (A) and (C) with a compound of the formula (6):

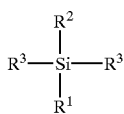

(6)

wherein $R^1$, $R^2$, and $R^3$ are as defined above, for introducing into at least one terminus a group of the formula (12):

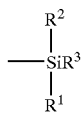

(12)

wherein $R^1$, $R^2$, and $R^3$ are as defined above.

19. The method of claim 18 wherein the molar ratio of components (A) tp (C) is from more than 1.0 to 4.0.

20. The method of claim 18 further comprising the step of modifying the reaction product between components (A) and (C) with an organic acid, inorganic acid or epoxy compound.

21. The method of claim 18, wherein $R^2$ is a monovalent organic group of the formula (2):

—$R^4(NR^5CH_2CH_2)_aNR^6{}_2$ (2)

wherein $R^4$ is a divalent hydrocarbon group of 1 to 6 carbon atoms, $R^5$ and $R^6$ are independently selected from hydrogen and unsubstituted or hydroxyl-substituted monovalent hydrocarbon groups of 1 to 50 carbon atoms which may be separated by an oxygen atom, and a is an integer of 0 to 4.

22. The method of claim 18 wherein $R^2$ is a monovalent organic group of the formula (3):

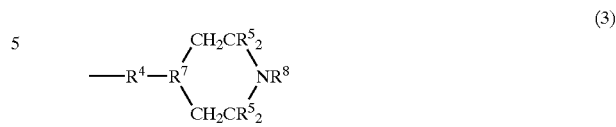

(3)

wherein $R^4$ is a divalent hydrocarbon group of 1 to 6 carbon atoms, $R^7$ is selected from the group consisting of —CH=, —N=, —OCH=, and —ON=, $R^5$ is hydrogen or a monovalent hydrocarbon group of 1 to 8 carbon atoms, and $R^8$ is hydrogen or methyl.

23. The method of claims 18, wherein $R^2$ is a monovalent organic group of the formula (4):

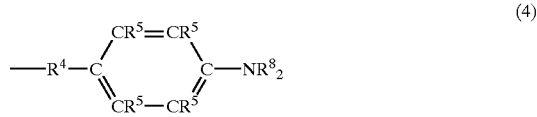

(4)

wherein $R^4$ is a divalent hydrocarbon group of 1 to 6 carbon atoms, $R^5$ is hydrogen or a monovalent hydrocarbon group of 1 to 8 carbon atoms, and $R^8$ is hydrogen or methyl.

24. The method of claim 21 wherein $R^2$ is —$C_3H_6NH_2$, —$C_3H_6NHC_2H_4NH_2$, or —$C_3H_6NHC_2H_4NHC_2H_4NH_2$.

25. The method of claim 18 wherein $R^3$ is —$OCH_3$.

* * * * *